United States Patent
Faur et al.

(10) Patent No.: US 6,409,889 B2
(45) Date of Patent: *Jun. 25, 2002

(54) METHOD FOR THE REMOVAL AND RECOVERY OF INORGANIC POLLUTANTS FROM WASTE AQUEOUS SOLUTIONS AND WASTE PRIMARY AIR SOURCES

(75) Inventors: Mircea Faur; Maria Faur; Horia M. Faur, all of North Olmsted, OH (US)

(73) Assignee: Special Materials Research and Technology, Inc., North Olmsted, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,226

(22) Filed: Apr. 13, 1999

(51) Int. Cl.[7] .............................................. B01D 53/00
(52) U.S. Cl. .............................. 204/157.44; 204/157.3; 204/157.4; 204/157.43
(58) Field of Search ..................... 204/157.3, 157.44, 204/157.43, 157.4

(56) References Cited

U.S. PATENT DOCUMENTS

| | | | |
|---|---|---|---|
| 3,653,185 A | * | 4/1972 | Scott et al. ............... 204/157.3 |
| 3,899,404 A | | 8/1975 | Iverson |
| 3,899,405 A | | 8/1975 | Iverson et al. |
| 3,929,433 A | * | 12/1975 | Lucero ..................... 204/157.3 |
| 4,014,787 A | | 3/1977 | Shorr |
| 4,124,405 A | | 11/1978 | Quienot |
| 4,141,828 A | | 2/1979 | Okada et al. |
| 4,329,224 A | | 5/1982 | Kim |
| 4,340,473 A | | 7/1982 | Lindman et al. |
| 4,648,977 A | | 3/1987 | Garg et al. |
| 4,690,741 A | | 9/1987 | Walsh, III et al. |
| 5,006,216 A | | 4/1991 | Dietrich et al. |
| 5,011,610 A | | 4/1991 | Martin et al. |
| 5,011,611 A | | 4/1991 | Jerábek et al. |
| 5,160,636 A | | 11/1992 | Gilles et al. |
| 5,205,906 A | | 4/1993 | Grutsch et al. |
| 5,227,053 A | * | 7/1993 | Brym .......................... 210/143 |
| 5,391,298 A | | 2/1995 | Pieper et al. |
| 5,545,326 A | | 8/1996 | Petering |
| 5,571,385 A | | 11/1996 | Faur et al. |
| 5,597,489 A | | 1/1997 | Schneider et al. |
| 5,616,241 A | | 4/1997 | Khudenko |
| 5,695,616 A | * | 12/1997 | Helfritch et al. ......... 204/157.3 |

* cited by examiner

*Primary Examiner*—Edna Wong
*Assistant Examiner*—Thao Tran
(74) *Attorney, Agent, or Firm*—Pearne & Gordon LLP

(57) ABSTRACT

This invention refers to a removal and recovery method of pollutant materials. A waste stream source of polluted water and/or waste gases containing waste acids, bases and salts, and/or waste air pollutant suspension particles are fed into a separation reactor. The combined physicochemical effects of removal/recovery of pollutants inside the reactor take place by solubilization, ionization, reaction, deposition and settling, which concurrently remove and separate the pollutants as solid materials, deposited on selective electrodes sets, as gases and as sludge and/or precipitates. The reactor is kept at the working temperature using a waste industrial heat, and the separation processes take place by applying a voltage source between a spaced apart system of selective electrodes, and by using a ionizing source of waste spent fuel nuclear bars or electromagnetic radiation.

10 Claims, 15 Drawing Sheets

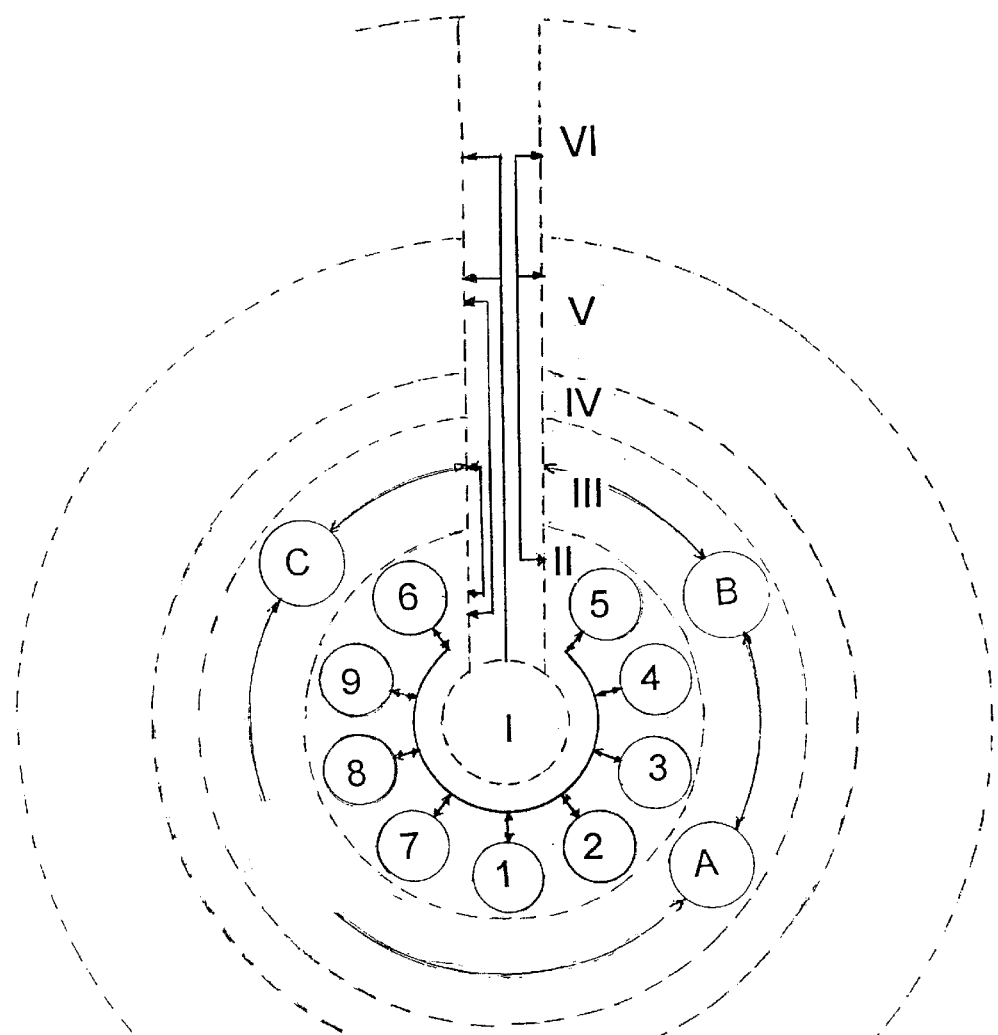

Figure 15

I NUCLEAR POWER STATION AREA
II INDUSTRIAL AREA: (1) Waste Management Industries; (2) Metallurgy Industry;
 (3) Construction Materials Industry; (4) Synthetic Gas Industry; (5) Chemical Industry;
 (6) Electronics Industry; (7-9) Other Industries.
III SOLAR ENERGY ELECTRIC SYSTEMS AND HYDROGEN PRODUCTION BUFFER
 AREA: (A) Solar Photovoltaic/Wind Electric Energy Production Facilities;
 (B) Hydrogen and Oxygen Production Facilities; (C) Hydrogen Storage Facilities.
IV FOREST AND AGREEMENTS BELT
V RESIDENTIAL AREA
VI AGRICULTURE AND FOOD INDUSTRY AREA

METHOD FOR THE REMOVAL AND RECOVERY OF INORGANIC POLLUTANTS FROM WASTE AQUEOUS SOLUTIONS AND WASTE PRIMARY AIR SOURCES

BACKGROUND OF THE INVENTION

This invention is directed generally to improvement of environmental protection, materials recovering, recycling, and resource conservation, using a novel procedure and method for the removal and recovery of inorganic pollutant materials from waste water sources of aqueous solutions and/or from waste gases and/or suspension particles sources.

Waste pollutant materials treatment procedures and processes have been and continue to be a matter of great importance for environmental protection and for resources conservation. Many industrial and commercial processes generate substantial quantities of waste water, waste gases and waste suspension particles, much of which are contaminated with toxic metal elements and/or ions such as heavy metals (e.g., lead, copper, zinc, cadmium, nickel, arsenic, chromium, etc.,), compounds with toxic elements, dissolved inorganic elements (e.g., calcium, sodium, sulfates, phosphates, etc.), primary air pollutant gases (e.g., nitrogen oxide, nitrogen dioxide, carbon disulfide, hydrochloric acid and sulfuric acid, etc.,), and aerosols and/or suspension particles (e.g., hydrochloric, sulfuric, and nitric acid aerosols and metal oxide particles).

The most pollutant industrial and commercial processing plants include electronic, non-ferrous and ferrous metallurgical, chemical, textile, pharmaceutical, pigments and dyes, construction materials, nuclear, food, etc. Most pollutants of above industries cannot be discharged into environment without endangering the biological and environment health. In many urban areas throughout the world industrial born air and water pollution reach and exceed toxic level thresholds. For example, in the United States, the Great Lakes Basin has on of the largest population density in the U.S., and is one of the world's largest pollutant area. This basin, bordered by Northeast of U.S. and by Southeast of Canada, with the world's largest fresh water reservoir, is one of the most affected by man's activities. As existing pilot watershed studies show, some of the most pollutant sources in the Grate Lakes Basin are due to urban industrial and commercial activities. Addressing this issue is therefore increasingly important. Also, the recovery of valuable materials by large industries is becoming one of the resource conservation priorities.

An important requirement of water and air quality management and of the man's life is to prevent the rivers water and lakes water pollution with polluted liquids of industrial waste and to disperse in air industrial gaseous pollutants. Thus, it is fundamental that the removal and recovery of industrial pollutants are made simultaneously or successively in their own industry origin, in small or large treatment facilities, before the waste polluted liquids are discharged in rivers, lakes and seas. The waste water and air quality criteria and requirements not only depend on the specific industry, but also on the feed water quality and on the environmental biology and therefore the methods for waste water and waste gaseous materials treatment. Therefore, the treatment methods of pollutant waste suspension particles in water and air are very diversified.

Many physical, chemical, physicochemical, biological technologies and combination of them are well known in the art, and a large number of processes and technologies have been applied quite successfully for the treatment of waste waters and waste gases, and waste suspension particles and for other environment related applications. The waste water and waste air pollutants removal and recovery treatment procedures, processes, methods and apparatuses are described in literature in many books, monographs, and papers, as for example:

*Fundamentals of Air Pollution Engineering*, Prentice Hall, 1988, by Richard C. Flagan, John H. Seinfeld.

*Water Treatment Handbook, Degremont*—Societe Generale d'Epuration et d'Assainissment, France, 1973.

*Waste Water Treatment Technology*, Ann Arbor Science Publishing Inc., 1975, by James W. Patterson.

*Air Pollution Control and Design Handbook*, Marcel Decker, Inc., vol. 1 and vol. 2, 1977, by Paul N. Cheremisinoff, Richard A. Young.

*The Solubility of Nonelectrolytes*, Dover Publications, Inc., New York, 1964, by Joel H. Hildebrand and Robert L. Scott.

*Crystallization as a Separations Process*, American Chemical Society, Washington D.C., 1990, by Allan S. Myerson and Ken Toyokura.

*Technologies for Small Water and Waste Water Systems*, (Environmental Engineering Series), Van Nostrand Reinhold, New York, 1991, by Edward J. Martin, Edward T, Martin.

*Pollution Prevention In Industrial Processes*, American Chemical Society, Washington D.C., 1992, by Joseph J. Breen and Michael J. Delarco.

*Data for Radioactive Waste Management and Nuclear Applications*, John Wiley & Co., 1985, by Donald C. Stewart.

*Industrial Water and Waste Water Systems*, Publishing House Stroyizdat, Moscow (Russian), 1990, by S. V. Yakovlev, Ya. A Karelin, Yu. V. Voronov.

*Environmental Strategy for The Great Lakes System*—Final Report to The International Joint Commission from International Reference Group on Great Lakes Pollution, 1978.

*Physicochemical Methods for Water and Water Treatment*, Pergamon Press, 1980, by Lucjan Pawlowski.

*Kinetic of Metal Ion Adsorption from Aqueous Solutions (Models, Algorithms, and Applications)*, by Sotira Yiacoumi and Chi Tien, Kluwer Academic Publishers, Boston, 1995.

*Poisoning and Promotion in Catalysis Based on Surface Science Concepts and Experiments*, by M. P. Kiskinova, Elsevier, Amsterdam 1992.

*Separation and Purification by Crystallization*, by Gregory D. Botsaris and Ken Toyokura, ACS Symposium Series 667, Washington, D.C. 1997.

Various fundamental,and practical aspects of the relevant pollutant waste inorganic sources treatment processes, including physicochemical phase transition processes as well as different procedures, methods and apparatuses implied in our patent description are also described in the above listed sources. These data are also applicable to waste organic pollutant of chemical elements treatment, e.g., removal and/or recovery of pollutants molecules and systems which have permanent or temporary dipole momentum.

There are many waste water and waste air pollutants treatment processes in use today, e.g., ion exchange, coagulation-flocculation-sedimentation, chemical precipitation (e.g., sulfide precipitation, hydroxide precipitation, etc.,), chemical oxidation/reduction, filtration, activated chemical absorption, to name just a few, and in consequence, a large variety of methods and apparatuses have been developed. All of these processes have advantages that may recommend them for particular applications, and disadvantages that preclude their use for other applications. For the sake of clarity we are only giving here a few examples.

Ion exchange methods are useful where decontamination and recovery of precious metals is desirable. However, ion exchange resins are expensive, and ion exchange methods cannot ordinarily be used effectively for solutions containing high concentrations of ancillary salts.

Hydroxide precipitation is inexpensive and effective to precipitate metals having insoluble hydroxides which are not dissoluted in excess alkali. However, alkali hydroxide is poisonous and corrosive and the excess hydroxide must be neutralized with acid before the treated waste water can be returned to the environment.

Sulfide precipitation can be used effectively to precipitate contaminated metals which form insoluble sulfides (U.S. Pat. No. 4,329,224). However, soluble sulfides from toxic liquids can release one of the most toxic and unpleasant gases on exposure to acids. Thus, any process using compressed hydrogen sulfide, or soluble sulfide, is inherently dangerous. The method for reducing the concentration and for recovering of any undesirable metals dissolved in contaminated waste water is less dangerous using the sulfite process (U.S. Pat. No. 5,011,611) than with the sulfide process. Of course, the pollutant metals removed from solution by this process do not disappear. They remain in the sediment. or solid phase until recycled or disposed of. Furthermore, the resulted $SO_2$ is an irritating gas and although it is stable in a dry medium, when it is discharged in a wet air atmosphere and under solar radiation, or when suspension of small particles are present, it forms acidic rain, so it necessitates a recovery treatment before discharging.

Many methods and processes in use today for removing and/or recovering of inorganic pollutants are based on reactions of chemical compounds, chemical elements reaction, and combination of chemical compound reactions with physical methods. Generally, these methods, procedures and processes require large quantities of chemical materials.

SUMMARY OF THE INVENTION

The present invention relates to a new method for treating polluted waste industrial and commercial water, and/or primary air pollutants such as waste industrial gases, and/or suspension particles, such as toxic aerosols, to remove and/or recover undesirable polluting metals, inorganic compounds, dissolved inorganic elements from water, toxic inorganic gases and toxic suspensions present in air and water. The novel method and procedure described in the present invention by using waste heat, nuclear radiation of spent fuel bars, waste chemical products, waste suspension particles and electrical power, does not have some of the disadvantages, dangers and other limitations of prior-known procedures and/or methods of pollutants removal and recovery from industrial waste water and waste air pollutants. The method of present invention consists of treating waste polluted water, and/or waste pollutant gases, and/or waste suspension pollutant particles in air, using the combined, and simultaneous/successive conjugated physicochemical effects (CSCPCE) of pressure, temperature, electric- and radiation fields, and air/or aqueous suspension particles.

According to the present invention nuclear-, thermal-, electrical-, and mechanical energy, waste pollutant and/or non pollutant suspension particles can be used for the removal and/or recovery of inorganic pollutants from waste industrial water and/or waste industrial pollutants of air. The nuclear or electromagnetic radiation produce ionization of pollutant chemical elements and compounds, and the ionization rate increases with increasing temperature. The electric field produces ion's separation from the aqueous solution and deposits it them into the solid phase on multiple pairs of spaced apart selective electrodes, as non-pollutant and recovered materials. For water insoluble and hard soluble chemical pollutant compounds with positive solubilization coefficients, an increased pressure and temperature produces/increases the solubilization of the pollutants by allowing the reaction's activating energy of different solution components to decrease, which facilitates the formation of new compounds which are non pollutant or less pollutant. The resulting chemical compounds remain in the aqueous medium or are removed and/or recovered as gases and/or sludge. For pollutant materials which have negative coefficient of solubilization in water, elevated temperatures at elevated pressures are not required to increase the solubility and, consequently, the pollutant's separation take place on selective electrodes under an electric field through phase transition processes into solid phase. The suspension of pollutant and non pollutant particles in air and/or water act as catalytic agents for the ionization processes above and for the formation of new chemical ions and compounds which require a lower ionization energy. Besides, the suspension particles act as condensation and coagulation centers and as catalyst for the solid, gas and sludge phases formation. Furthermore, the suspension particles catalyze the formation of non polluted gases and liquid compound components, through a chemical absorption mechanism. In certain physicochemical hydrothermal conditions of pressure, and radiation, the suspension particles act as mineralizers in the hydrothermal physicochemical phase transition processes. Suspension particles with certain composition, in determined hydrothermal conditions help phase transitions processes, such as: crystallization, coagulation and precipitation, and gasification processes to take place.

The objectives of the present invention are to provide a novel method for:

simultaneous removal and/or recovery of inorganic pollutants from waste polluted water and/or waste gaseous materials, and/or waste suspension particles in air and water;

waste pollutant removal from waste water and for the pollutant materials recovery using a selective system, with spaced apart electrodes, immersed in contaminant liquids;

improving solubilization and/or ionization, and flocculation and/or coagulation of waste pollutant elements, chemical compounds or suspension particles;

synthesis from pollutant chemical systems, of new compounds/radicals, and/or ions, less pollutant or non pollutant, which are easier removed and/or recovered;

removal and/or recovery of inorganic pollutants from waste water and of waste gases pollutants using waste pollutant suspension particles or non-pollutant suspension particles as catalyzer of physicochemical processes;

improving inorganic pollutants removal and/or recovery from waste polluted water, and/or from waste polluted gases, and/or from waste polluted suspension particles using nuclear radiation of spent fuel nuclear bars or electromagnetic radiation;

pollutant removal and recovery using waste heat sources.

BRIEF DESCRIPTION OF THE DRAWINGS

FIG. 15 is a schematic diagram of a "Clean Town."

DESCRIPTION OF THE PREFERRED EMBODIMENTS

Figure 1:
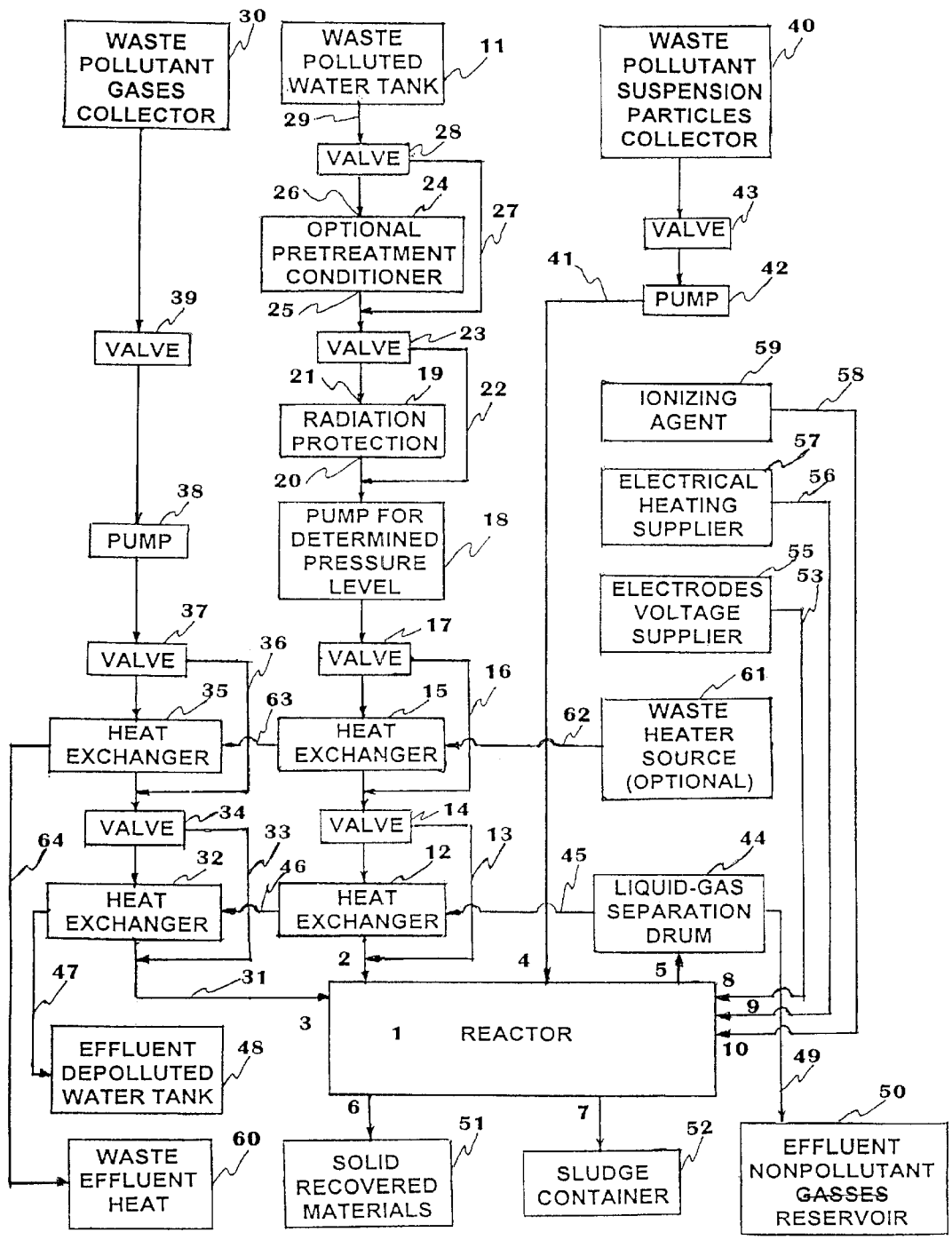
FIG. 1 is a schematic block diagram of the waste polluted water, waste pollutant gases and waste pollutant suspension particles simultaneous treatment method for the removal and/or recovery of pollutants.

The aqueous solutions of inorganic pollutant compounds, such as those with metallic elements, elements ions and their ionic compounds, and with air inorganic pollutants, such as gaseous materials and suspension toxic particles, in specific physicochemical hydrothermal conditions of pressure, temperature, electric/electromagnetic/nuclear radiation, and mineralizers/catalyzers, form stable structural units in aqueous solutions. These stable structural units are determined primarily by the directional nature of strong hydrogen bonds between the ware molecules themselves and then by the interactions between water molecules and ions, between water molecules and polar groups, between water molecules and suspension particles, and between ions/radicals/compounds themselves and with each other. The hydrothermal growth investigation of some structural units have been carried out in water and aqueous solutions at temperatures up to 300° C. and pressures up to 2000 atm. At atmospheric pressure, as the temperature increases, the structure of the liquid solutions and that of compounds change, and the bonds become weak. Increasing the pressure has the opposite effect, i.e., liquid molecules, complex molecules and ions tend to retain their spatial ordering, at least a short range order. The length of ordered units, their strength, mutual positions, charges, and the type of interactions, determine: (i) the relationship between compounds and compounds components in aqueous hydrothermal conditions, (ii) the formation of new chemical compounds and/or radicals, (iii) the mechanisms of phase transition into solid phase, (iv) the deposition in an electric field, and, out the range of the electric field, as ordered structures on electrodes and/or sides, and (v) the precipitation, transition, or formation of new into phase. For the industrial and commercial pollutants, such as primary air pollutants (e.g. sulfur oxides and nitrogen oxides), the aerosols particles require a catalyst for the removal/transformation from/into other chemical structural systems, which are easier removed. The successively catalyzed reactions are developed in the presence of water, radiation, and suspension pollutant/non-pollutant catalyzing particles, in which case, the processes are driven in the wanted direction. Because of the known effects of pressure, temperature, and of electric field on phase transitions equilibrium in aqueous solutions, the presence of pollutant/non-pollutant suspension particles produces crystallization/coagulation of points/centers of metal's ions and of metal's radicals. The suspension particles, such as the impurities usually present in aqueous solutions, also modify the suspension solution equilibrium, namely, the supersaturation is increased and, as a result, increase the liquid to solid phase transformation rate. Thus, the waste suspension pollutant particles (WSPP) catalyze the processes by removing and recovering the metals and in particular the heavy metals from aqueous solutions. Also, the WSPP catalyze chemical reactions of the pollutant gases molecules or ions with radiation and with water which helps the transformation of pollutant gases into removable compounds and the recovery of useful components.

Besides, the WSPP are removed and recovered by themselves through the transformations process participation.

The removal and the recovery of inorganic pollutants from industrial and commercial waste water and waste air pollutant are realized by using the combined and simultaneous/successive conjugated physicochemical effects (CSCPCE) of pressure, electromagnetic/spent fuel nuclear bar radiation, the catalytic action of fine suspension polluted or non polluted particles, and that of the electric field on solubilization, ionization, chemical reactions and the formation of new compounds or radicals, for the separation and/or recovery of pollutant materials and for their recycling as non polluted materials. The reactions involved, which are developed in aqueous environment under pressure, radiation, temperature, gradient of temperature and electric field, follow such chemical kinetics mechanisms which will allow to remove and/or recover the pollutant materials as solid phase, gases and as sludge.

In the present invention, strong correlated with phase transitions of pollutant materials, and the removal and recovery processes, are the phenomena of the pollutant elements, compounds, ions, and radicals segregation and solidification, which are determined by the interactions between the solid surfaces and the structure of chemical pollutant complex particles, such as elements, compounds, ions and radicals. Thus, a chemical pollutant complex particle, which is close to a freezing front, it may be trapped into solid state or may be repulsed by the freezing interface. The behavior of these interactions are depending essentially of the chemical pollutant complex particles size, their inner structure and the distance between the particles and the solid interface and, by the solid surface structure. The above conditions determine the proper choice of the selective electrodes and/or sides type, for the most effective removing and/or recovering of various depolluted pollutant element, compounds, ions and/or radicals. The reciprocal positions and the geometry of electrodes are important process parameters because they determine the electric field lines distribution among the electrodes and, consequently, the intensity of the transport forces in solution. Real grain systems have supplementary interactions associated with the grain boundary junctions, where another phase can occur. Our present cases are those of segregation of particles on a solid surface, with filled veins of the liquid solution at the triple junction of the grain boundaries. These so called foams are known as wet foams and have been described theoretically for two and three dimensions. For real grain growth the complete problem remains largely open yet, so that the optimum physicochemical conditions for recovering into solid phase are specific for each class of pollutants.

The removal and recovering of pollutants, in accordance with the present invention, are strongly correlated with the concentration of pollutants in the solution of polluted waste water, of polluted waste gases, and polluted suspension particles. The coordination numbers have their minimum values for dilute aqueous solutions and are usually higher for concentrated solutions. They may reach very high values in the more dense solutions not only because of their concentration of solute, but also because of the pressures employed in the hydrothermal aqueous processes. Furthermore, the structure of highly concentrated solutions approaches the solution structure to a large-pocked size of polluted elementary units. Thus, the rate of pollutant removal and/or recovering is higher for highly concentrated solutions as compared to that of the solution which contains lower concentration of pollutants. The change in the concentration of the solution is reflected in changes in its removal and/or recovering velocity coefficient range. Also, it is reflected in changes in the activity coefficients of water in a solution, and in the activity coefficients of the electrolyte in the same solution. Also, the solubility coefficient, which in different pollutant systems can be positive or negative, is strongly dependent on the temperature and pressure of the hydrothermal solution. For the systems with negative coefficient of solubility the phase transition into solid phase is processed at low or moderate temperature.

Due to the interaction of the solute with the solvate and the formation of ions, group of ions, complexes with atoms and ions, and because the phase transition and mass transfer are the criterion for the pollutant separation coefficient range, the selection of the proper physicochemical parameter are specific for each type or for a group of pollutants. Thus, the range of pressure, temperature, intensity of electric field, intensity and type of ionizing agent like radiation of spent fuel nuclear bars, the type and concentration of mineralizer/catalyzer, the type of selective electrodes and their geometrical settling and configuration, and the time of run, represent a set of parameters for the removal and/or recovery of inorganic pollutants from waste industrial and/or commercial aqueous solutions and from waste gases, and suspension particles.

Several examples of various block schemes of procedures and methods for the removal and/or recovery of pollutants are presented in the description of drawings, in the next section. The given examples are applicable for a large variety of pollutant water flows and types, and for a large variety of pollutant concentrations. Also, they are proper for low to high concentration of pollutant gases and suspension particles. As used herein the term of "pollutant water" refers to water having any amount of undesirable inorganic pollutants, namely from tens order percents down to 1 ppm or lower.

The preferred embodiments of the processes appear in the simplified schematic block diagrams in FIGS. 1 to 6, and in FIGS. 7–15. A reactor embodiment example is drown in FIG. 2 and the internal components details of named reactors and their physicochemical function are diagramed and explained in FIGS. 2 to 5. FIG. 2 and FIGS. 3 to 6 are intended to be representative examples of reactors and of their inner components that can be used to perform the processes and the methods of present invention.

FIG. 1 depicts, in a block form, the main general schematic of the processes according to the present invention. The schematic gives a general overview of the processes and of the components which are explained in greater detail in the schematic drawings of FIGS. 2 to 6.

Figure 2:
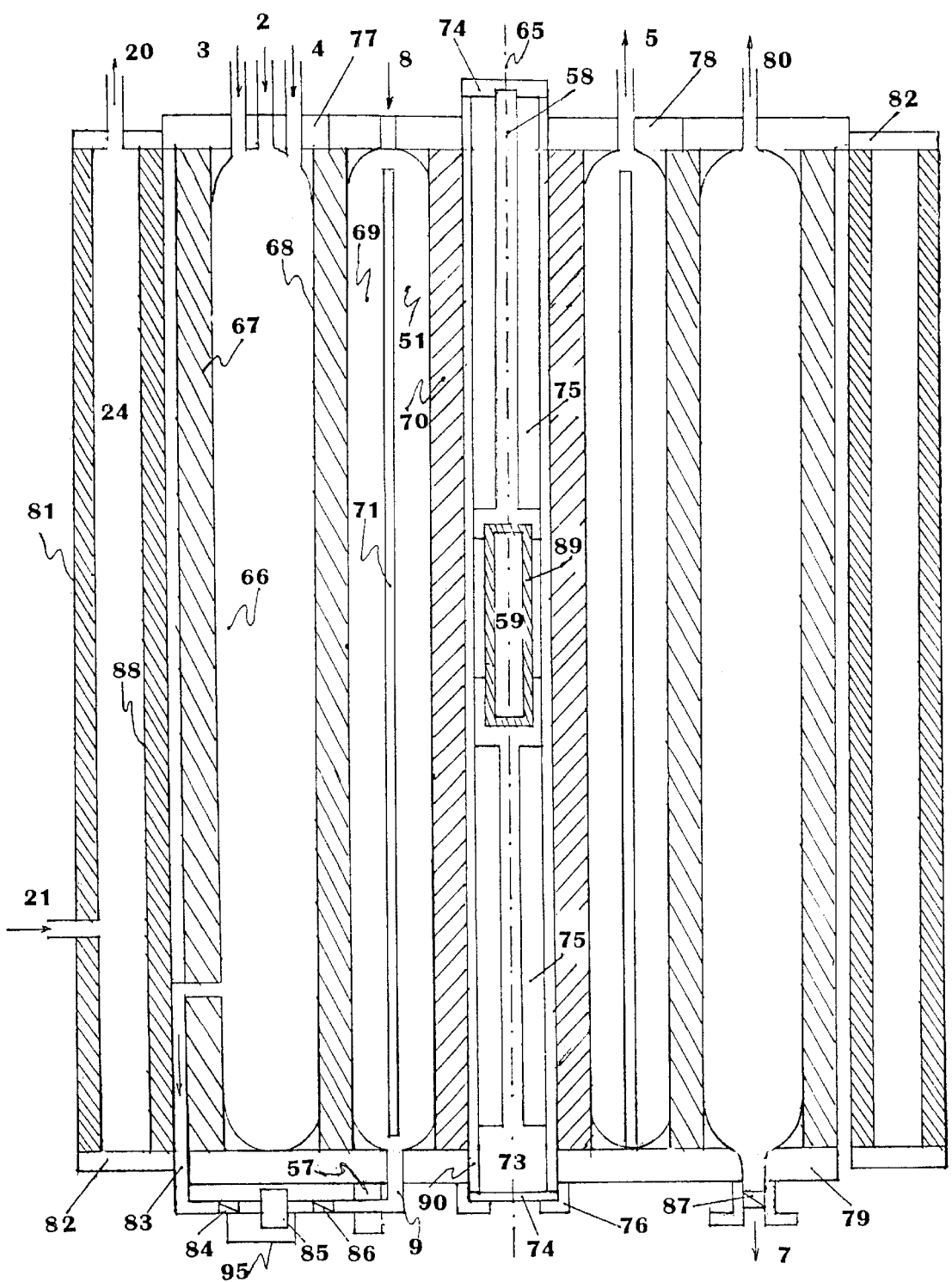
FIG. 2 is an example of a reactor axial cross section.
Figure 3:
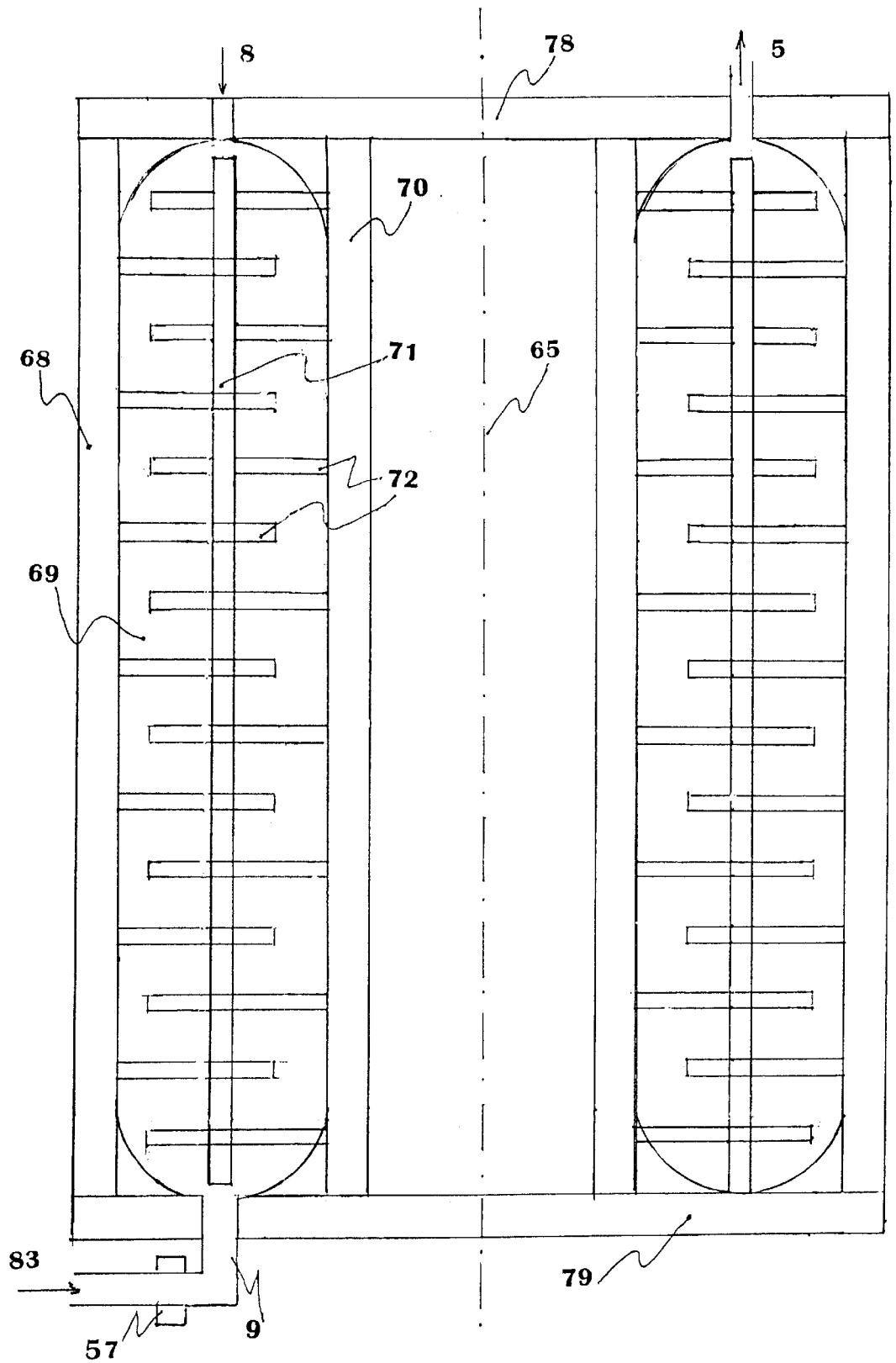
FIG. 3 is a cross-axial section view of a selective electrodes system.

Referring to FIG. 1, the vertical cylindrical reactor 1 is shown which includes inlets 2, 3, 4, 8, 9, 10 and outlets 5, 6, 7. The inlet 2 is coupled to a source 11 of polluted/contaminated water, such as a tank or industrial discharge pipe, through: heat exchanger 12 or line 13, valve 14, heat exchanger 15 or line 16, valve 17, pump 18, radiation protection water tank 19 or line 22, valve 23, water pre-treatment conditioner 24 or line 27, valve 28 and line 29. The digits 20 and 21, mean the outlet and inlet respectively of the protection water tank 19. The heat exchanger 12 is used for pre-heating of waste polluted water using the waste heat of treated effluent water, if the removing and/or recovering processes of certain types of pollutants require high temperature. The line 13 is used as an alternative line for the situations when the heating of the waste polluted water is not necessary. The heat exchanger 15 is used if waste water heating produced by the heat exchanger 12 is not enough. The heat which passes through the heat exchanger 15 is provided by a waste industrial heat source 61. The line 16 is used as an alternative when the pre-heating of the waste polluted water is not necessary. The line 22 is used for those physicochemical processes where no radiation protection is required, i.e., when using electromagnetic radiation as ionizing agent. The inlet 21 and outlet 20 of the radiation protection water tank 24 are shown in FIG. 2. The line 27 is used if the waste polluted water doesn't require pre-treatment, i.e., no content of settling particles. The outlet 25 and inlet 26 are part of the water pre-treatment conditioner system 24. The pump 18 determines the treatment pressure level in reactor 1. The inlet 3 of reactor 1 is coupled to a source of waste pollutant gasses 30 by means of: line 31, heat exchanger 32 or line 33, valve 34, heat exchanger 35 or line 36, valve 37, pump 38 and valve 39. The heat exchanger 32 is used for the pre-heating of waste pollutant gasses-using the waste heat of treated effluent water, if the physicochemical processes require high temperature for removing and/or recovering of certain types of gaseous pollutants. Line 33 is used as a alternative line when the gaseous pollutants heating is not necessary. The heat exchanger 35 is used if the heating of waste pollutant gasses, produced by heat exchanger 32, is not enough. The heat which passes through heat exchanger 35 is provided by a waste industrial heat source 61, the same as the heat exchanger 15 is using. Line 36 is used as an alternative line when heating of the gaseous pollutants is not necessary. The pump 38 is used for raising the reactor pressure to a level required by the physicochemical processes for removing and/or recovering of pollutants supplied by pump 18 to determined pressures level in reactor 1. The inlet 4 of reactor 1 is coupled to a collector 40 of waste pollutant suspension particles source, through line 41, pump 42 and valve 43. The pump 42 is used for reaching a pressure level required by the physicochemical processes for removing and/or recovering of pollutants, supplied by the pump 18 for a determined pressure level in reactor 1. The outlet 5 of reactor 1 is coupled to a treated water receiving tank 48 by means of liquid-gas separation drum 44, line 45, heat exchanger 12, line 46, heat exchanger 32 and line 47. Also, the outlet 5 of reactor 1 is coupled to waste effluent non pollutant gases reservoir 50 through liquid-gas separation drum 44 and line 49. The liquid-gas separation drum, as its name implies, separates the effluent mixture of depolluted water and non pollutant gasses. The outlet 6 is for recovered materials as a solid phase on a system 51 with selective electrodes 72, which are shown in FIG. 2 and FIG. 3. A sludge container 52 is connected with outlet 7 of reactor 1. The system of selective electrodes 72 from reactor 1 are connected, in inlet 8, with electrodes voltage supplier 55 by means of lines 53. The outlet 9 is connected with electrical heating supplier 57 through line 56. The electrical heating supplier 57 is used to ensure the temperatures required by the physicochemical removal and/or recovery processes for a certain type of pollutants are obtained. The inlet 10 means the connection of reactor 1 with ionizing agent 59 through the connection line 58. As ionizing agents are used waste radiation of spent nuclear bars, or X-rays of a X-ray source, or a source of electromagnetic radiation. A waste industrial heat source 61 is connected with heat exchangers 15 and 35 through lines 62 and 63 respectively, which is used, as described above, for heating the waste polluted water from the circuit of waste polluted water tank 11, and/or of waste pollutant gasses from circuit of waste gasses collector 30, if the physicochemical processes for certain types of pollutants require high temperature. The effluent heat is dispersed by outlet 60. Also, the waste heat of the removal and/or recovery of pollutants processes which take place in reactor 1 is used in heat exchangers 12 and 32 respectively for heating of waste polluted water from water tank 11 which enters into reactor 1, and of waste pollutant gases from collector 30 which enter into reactor 1, depending of the pollutants removing and/or recovering processes requirements. We propose in this invention the possibility of using of waste fuel nuclear bars radiation as ionizing agent 59 for removing and/or recovering of pollutants from waste industrial and commercial waters, gases and suspension particles. Also, the electromagnetic radiation can be used as ionizing agent, such as X-rays, visible spectrum of lights, ultraviolet radiation, microwaves, etc., as we will show in the one example in FIG. 2.

Figure 5:
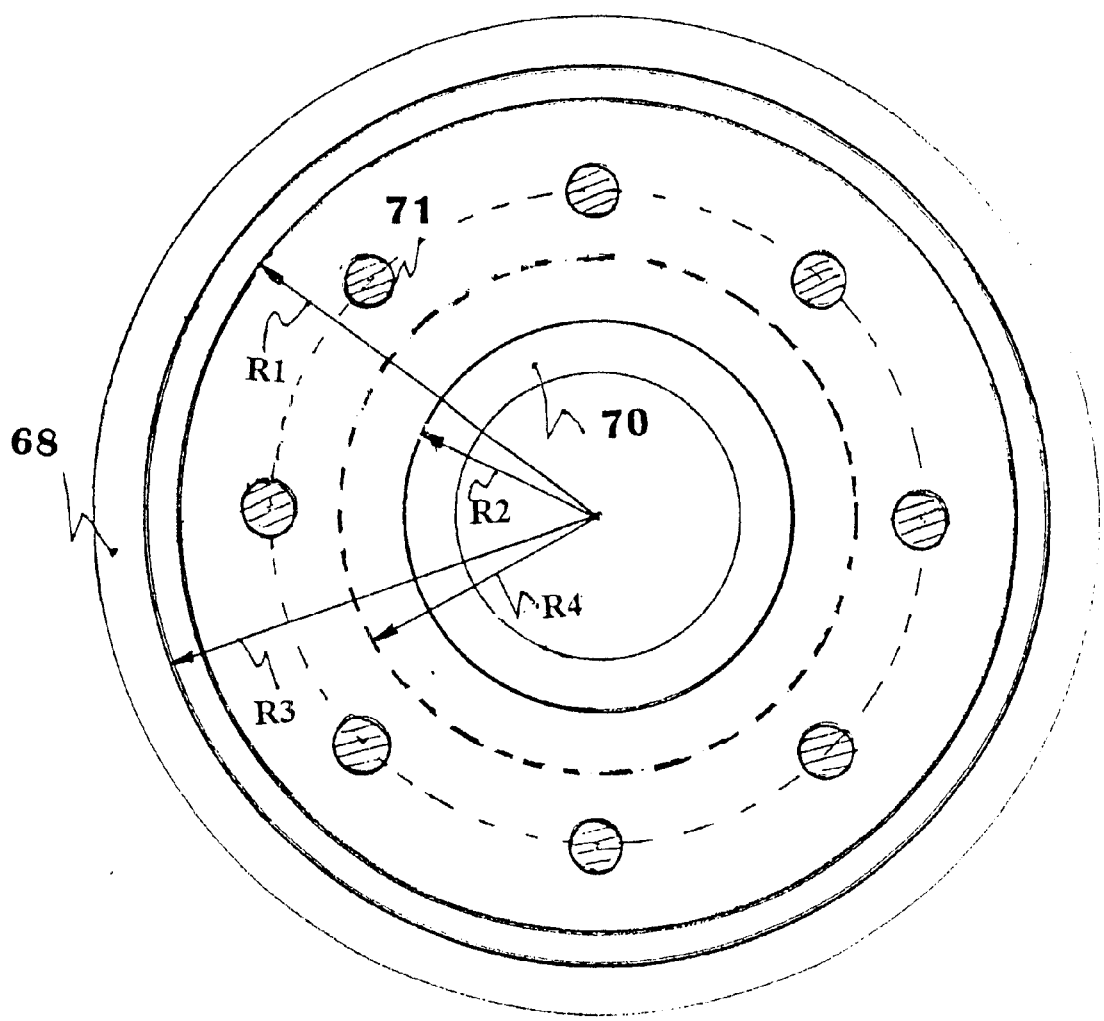
FIG. 5 is a horizontal plan view of selective electrodes system in FIG. 3.
Figure 6:
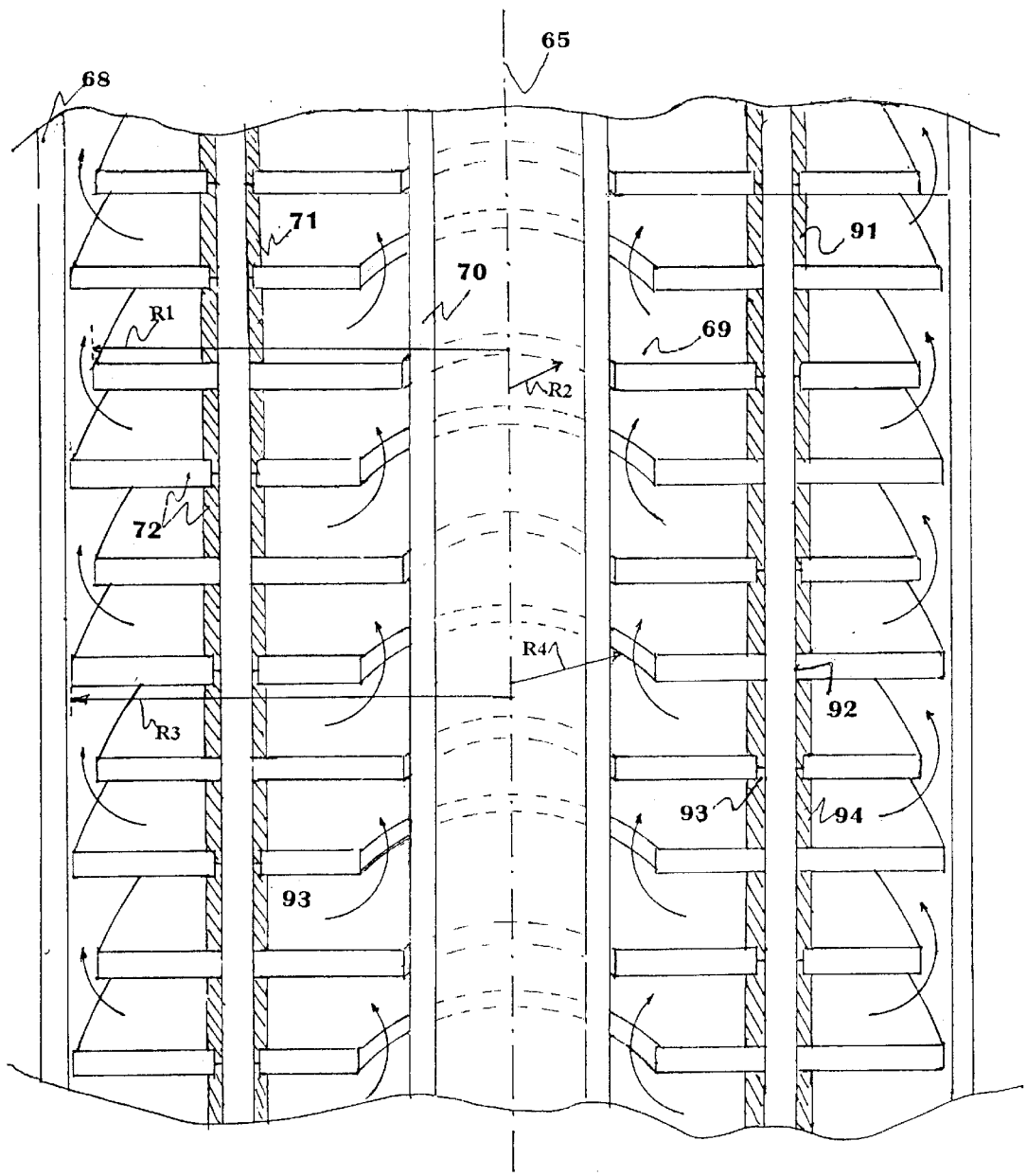
FIG. 6 is a cross-axial vertical section view of a half perspective electrodes set segment.

Referring to FIG. 2, a preferable cylindrical configuration which has a longitudinal axis 65, the volume space 66 is an external reaction chamber of the reactor, said first reactions chamber which is between the inner side of cylinder 67 (the external wall of the reactions chamber), and the outer surface of the cylinder 68. The cylindrical wall 68 contains the inner volume 69 of the internal reactions chamber 1, the said second reaction chamber which has the wall 70 and inner volume space 66. The component 71 represents a set of shelves for the selective electrodes and electrical connection as shown in FIG. 3 and FIG. 6. The volume spaces 66 and 69 respectively are defined as the volume where the physical phenomena and the chemical reactions take place, and into which a polluted and/or pollutant materials are removed and/or recovered. As shown in FIG. 5 and FIG. 6 the radius of discoidal electrodes are R1, R2 for the negative electrodes and R3, R4 for the positive electrodes, respectively.

Figure 4:
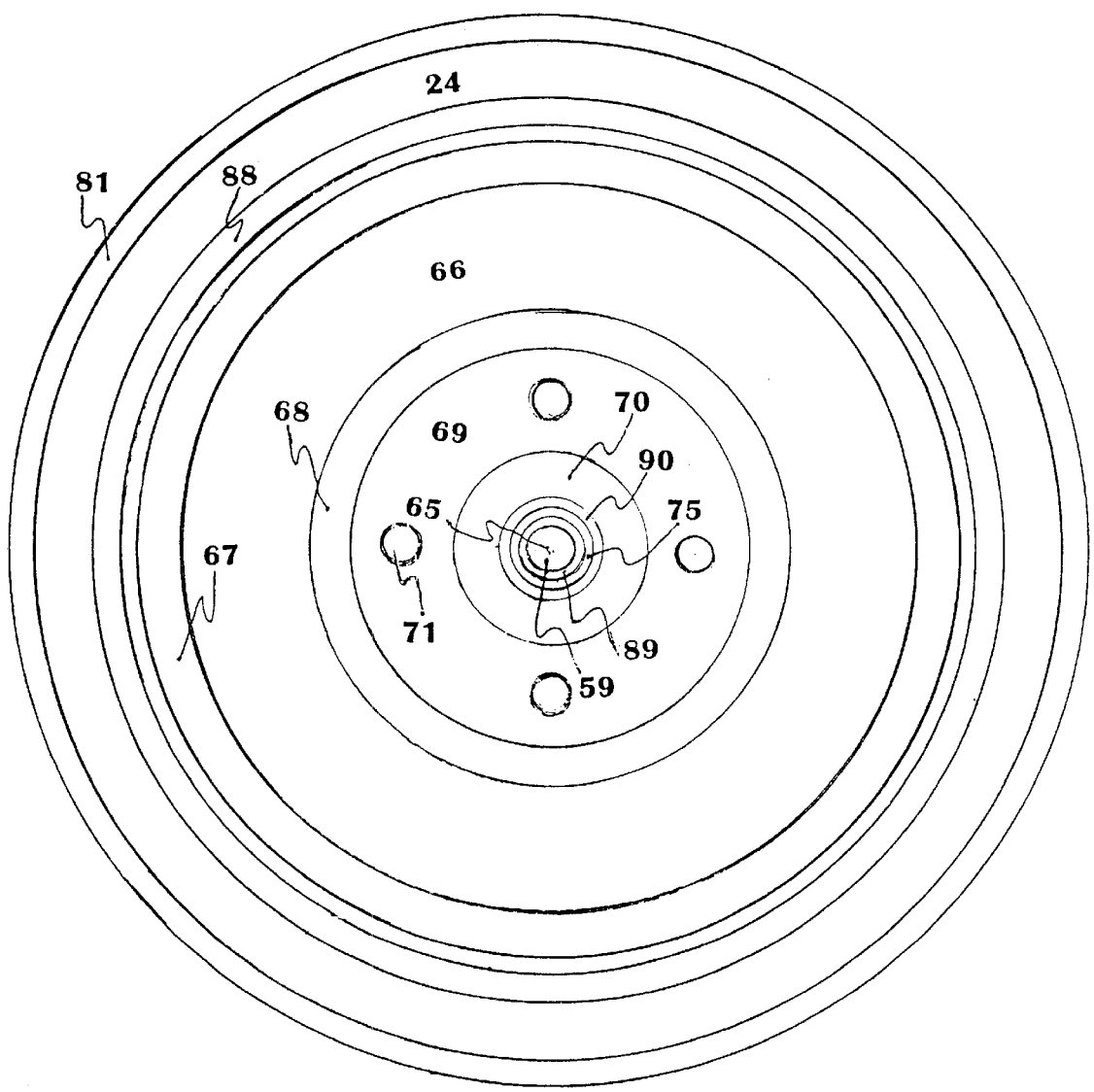
FIG. 4 is a cross section in the plane A–A' of reactor in FIG. 2.

The reciprocal spatial configuration of positive and negative electrodes and their electrical contacts 93 and electrical isolation 92 are shown in FIG. 6, where 94 act both as spaces and electrical insulators. As shown in FIG. 1, the polluted and/or pollutant materials, that are polluted water, pollutant gasses and pollutant suspension particles are introduced in the first reactions chamber 66 through inlets 2, 3 and 4, respectively and then passed into the second reactions chamber volume 69 through line 83, through valve 84, through pump 85 or line 95, through valve 86, through heater 57 and inlet 9. A discoidal system 51 of selective electrodes 72, shown in FIGS. 3, 5, 6 in a perspective view of half part of diagonal vertical section are placed in the said second reactions chamber and are supported by a shelves system 71. A more detailed view of the electrodes and the electrodes shelves are shown in FIGS. 6 with a cross radial axial section view of the discoidal selective electrode shown in FIG. 3, and a cross section in a horizontal plan shown in FIG. 5. The electrical connection of voltage supplier 55 to selective electrodes 72 are realized by the sets of bares 71 which pass through the inlet 8. Inside of container 9 closed with leads 74 is water 75 and a nacelle 89 with a ionization agent of ionizing source 59 located on the reactor axes 65 which is maintained. on the reactor axes by the guide-support 73 fixed on the bottom of cylinder 78 by holder 76, and by a bare 58. The first reactions chamber volume 66 of reactor has bottom and top lids 79 and the second reactions chamber volume 69 has bottom and top leads 78. As it shown in the description of invention, the removal and/or recovery of pollutants compounds, ionic radicals, and ions take place successively in the first reactions chamber and in the second reactions chamber respectively. Into volume space 66, the water and/or gasses and/or suspension particles pollutants ionizing, and/or solubilizing, and/or reacting are produced by pressure, temperature, ionizing radiation of waste spent fuel nuclear bars or electromagnetic waves. The solubilization is increased by pressure, the ionization is increased by temperature and by ionizing radiation, and both are catalyzed by pollutant and/or non pollutant suspension particles. The removing and/or recovering of pollutants in the reaction volume 66 are produced by reciprocally transforming the pollutant features in compounds, ionic radicals and ions, into a non-polluted sludge, which is eliminated through outlet 7. A cylindrical volume of polluted or non polluted water 24, situated between the external cylinder 81 and internal cylinder 88, which have inlet 21 and outlet 20 and leads 82, ensure the environment and personnel radiation protection. After pollutants treatment developed in space volume 66 the remaining radicals and ions which will are not removed, are directed for the next step of pollutants treatment by passing the polluted solution/liquid through line 83, valve 84, pump 85, valve 86, heater 9 to a cylindrical volume space 69 where there is a stronger radiation field and an electrical field is applied between positive electrode 71 and a system of selective negative electrodes 72. The voltage supply of electrodes 72 is such that the potentials are applied differentially for different segments of them, which enables each pollutants positive ions type to be removed from the fluid, and recover them selectively by depositing each ion type on another segment of the cathodes surfaces. A geometrical form of electrodes and shelves system in a axial section of reactor 1 is shown in FIG. 3 and FIG. 6, where reciprocal disposal determine the solution flowing through treatment volume 69 shown in FIG. 6 from valve line 83 to outlet 5. The reactions produced on electrodes surfaces produce non pollutant gasses, like hydrogen and oxygen, etc., which, are separated by water with liquid-gas separation drum 44. More details of the reactor components arrangement in a median lengths section of reactor 1 are shown in FIG. 4.

In the method of the present invention, the removal and/or recovery of pollutants is performed in the same reactor following same processes as those described in FIG. 1 and in the reactor presented in FIGS. 2 to 6. The method described herein is not restricted to the above description. It can be used for many combinations of pollutants components of various concentrations and aggregation states. The method and procedure, according to this invention can be scaled up or down for a smaller scale or a larger scale removal and/or recovering of pollutants. The foregoing and other objects, features and advantages of, the invention will be apparent from the following more particular examples of preferred embodiments of the invention.

EXAMPLE 1

Figure 7:
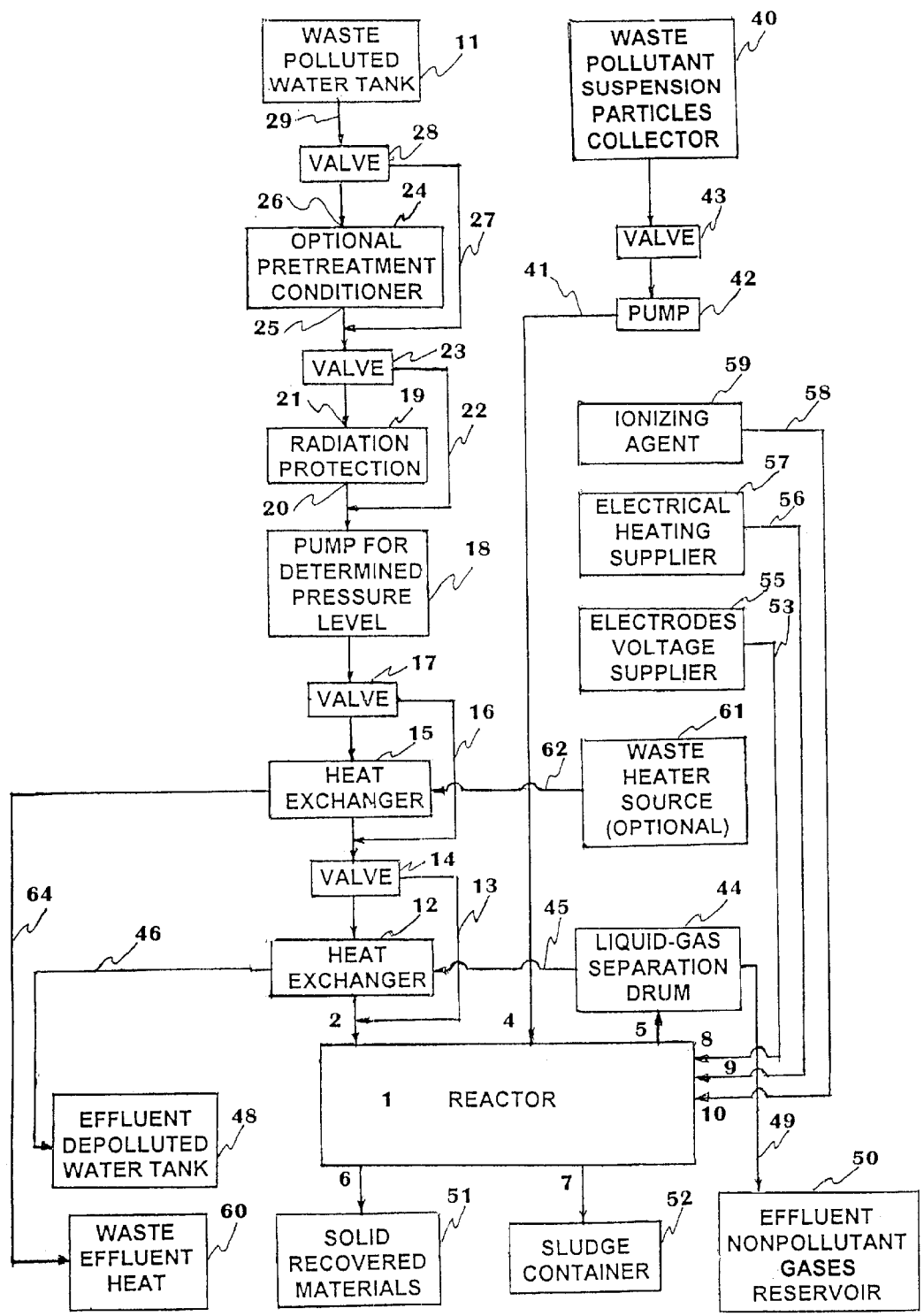
FIG. 7 is a schematic block diagram for waste polluted water and waste pollutant suspension particles treatment.

In FIG. 7 is presented an application of the method as described in FIG. 1 for removal and/or recovery of pollutants from effluent polluted industrial water and pollutant suspension particles. This is similar to FIG. 1 with a modification thereof, namely, waste pollutant industrial suspension particles, electric field, pressure and waste radiation are used as catalyzing processes and as base for multiple chemical reactions and phase transformation liquid-liquid, liquid-solid, solid-solid which reciprocally neutralize each-others own pollutant characteristics which would enable the water to be depolluted and to recover non-pollutant useful materials.

EXAMPLE 2

Figure 8:
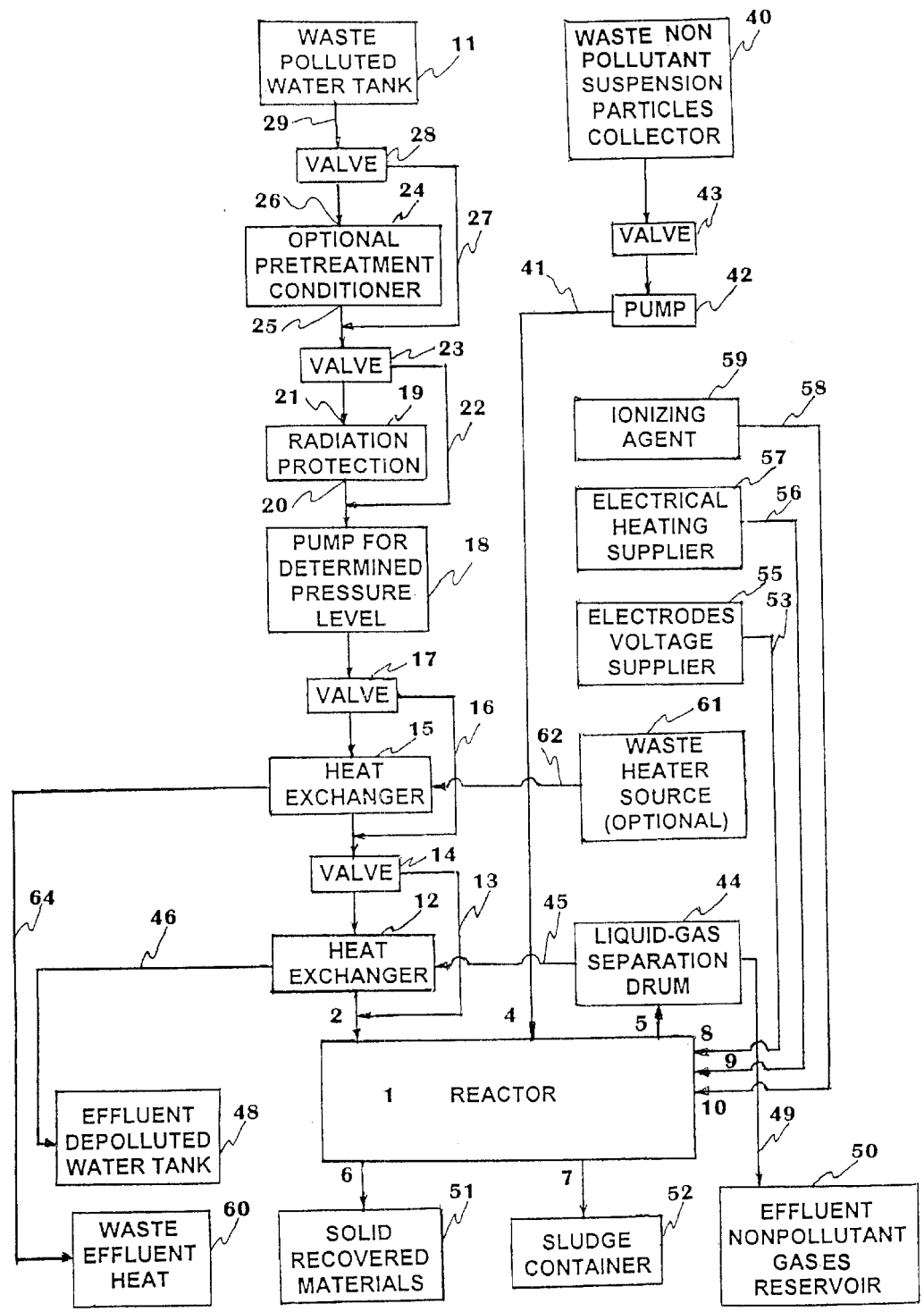
FIG. 8 is a schematic block diagram for waste polluted water treatment using non-polluted suspension particles.

The process presented in FIG. 8 is based on method in FIG. 1, but the chemical reactions between pollutant components in water take place in presence of chemical non polluted suspension particles which are used as a catalyzer and in presence of electric-, radiation-, temperature- and pressure fields, applied simultaneously or successively depending on the waste water pollutant components. The successive physicochemical complex reactions will enable the separation and recovery of solid, liquid and gaseous non pollutant recyclable materials.

EXAMPLE 3

Figure 9:
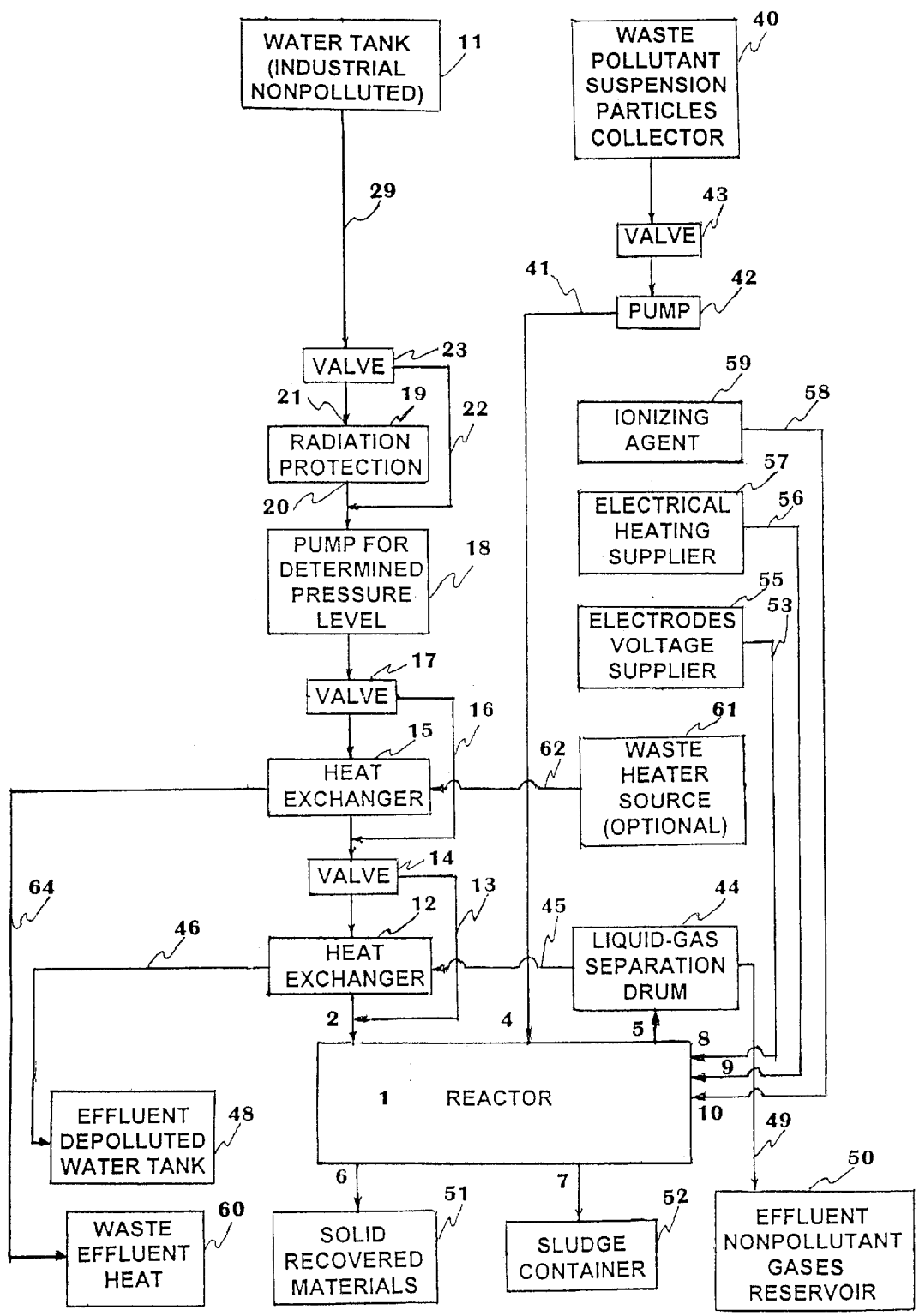
FIG. 9 is a schematic block diagram for waste pollutant suspension particles treatment using non polluted industrial water.

The process presented in FIG. 9 is for the removal and recovery of waste chemical, and/or physical, and/or biological pollutant suspension particles. This process is using non polluted industrial water which under pressure and temperature conditions at high pressure, temperature and/or radiation fields synthesis of new liquid and/or solid and/or gaseous phases of useful recyclable materials. A particular example of this process is the synthesis of useful ceramics materials.

EXAMPLE 4

Figure 10:
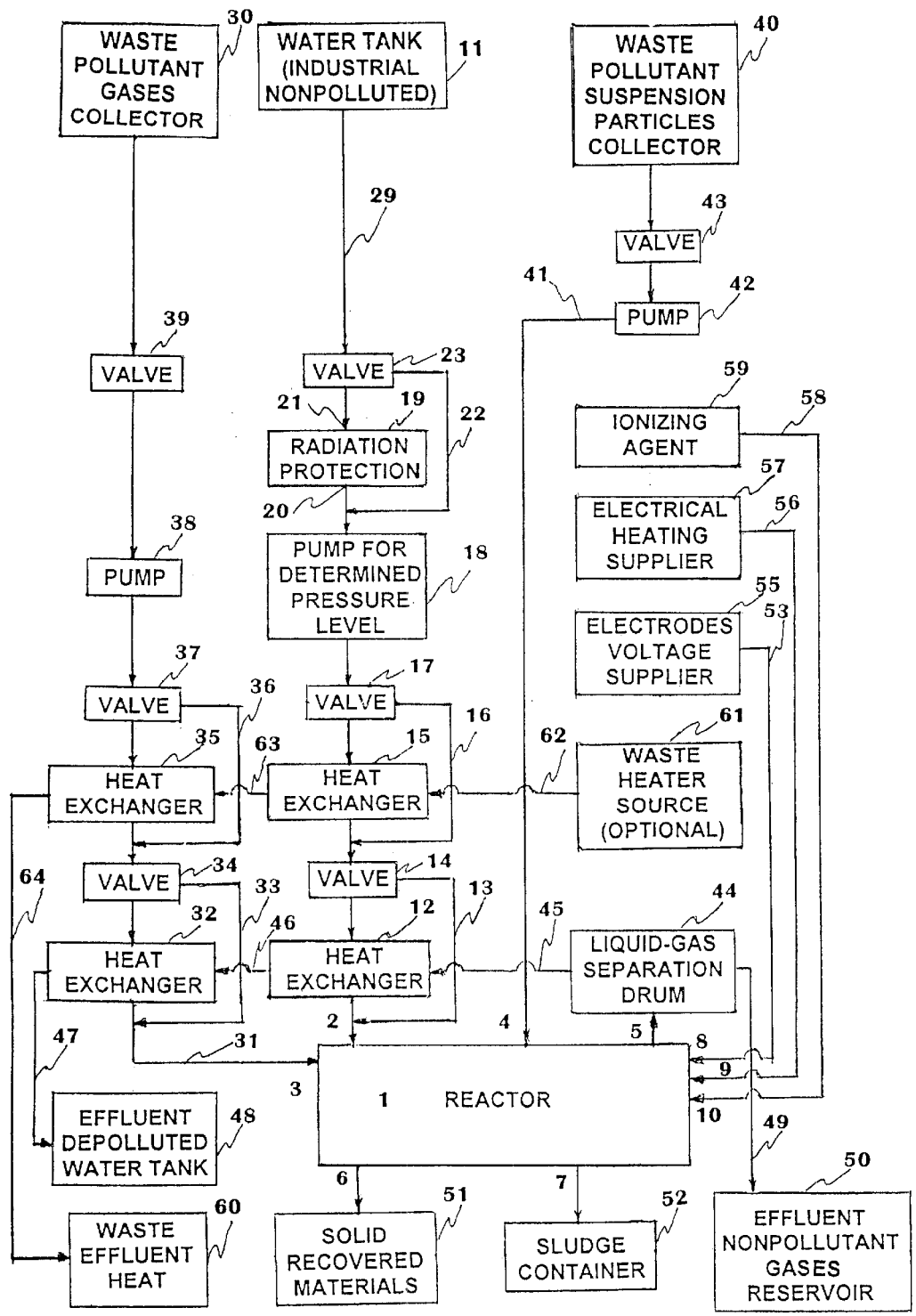
FIG. 10 is a schematic block diagram for waste pollutant gases and waste pollutant suspension particles treatment using non polluted industrial water.

The process presented in FIG. 10, is using industrial non polluted water, as a medium for the removal and/or recovery of pollutant gases and waste industrial pollutant suspension particles. The pressure, temperature and/or electromagnetic radiation and/or electrostatic field are used for chemical and/or components phase transformation to solid and/or liquid and/or gaseous non pollutant/recyclable materials. In this process, the pollutant suspension particles act as catalyst of ions and/or physicochemical systems transformation into non-pollutants/recyclable products.

EXAMPLE 5

Figure 11:
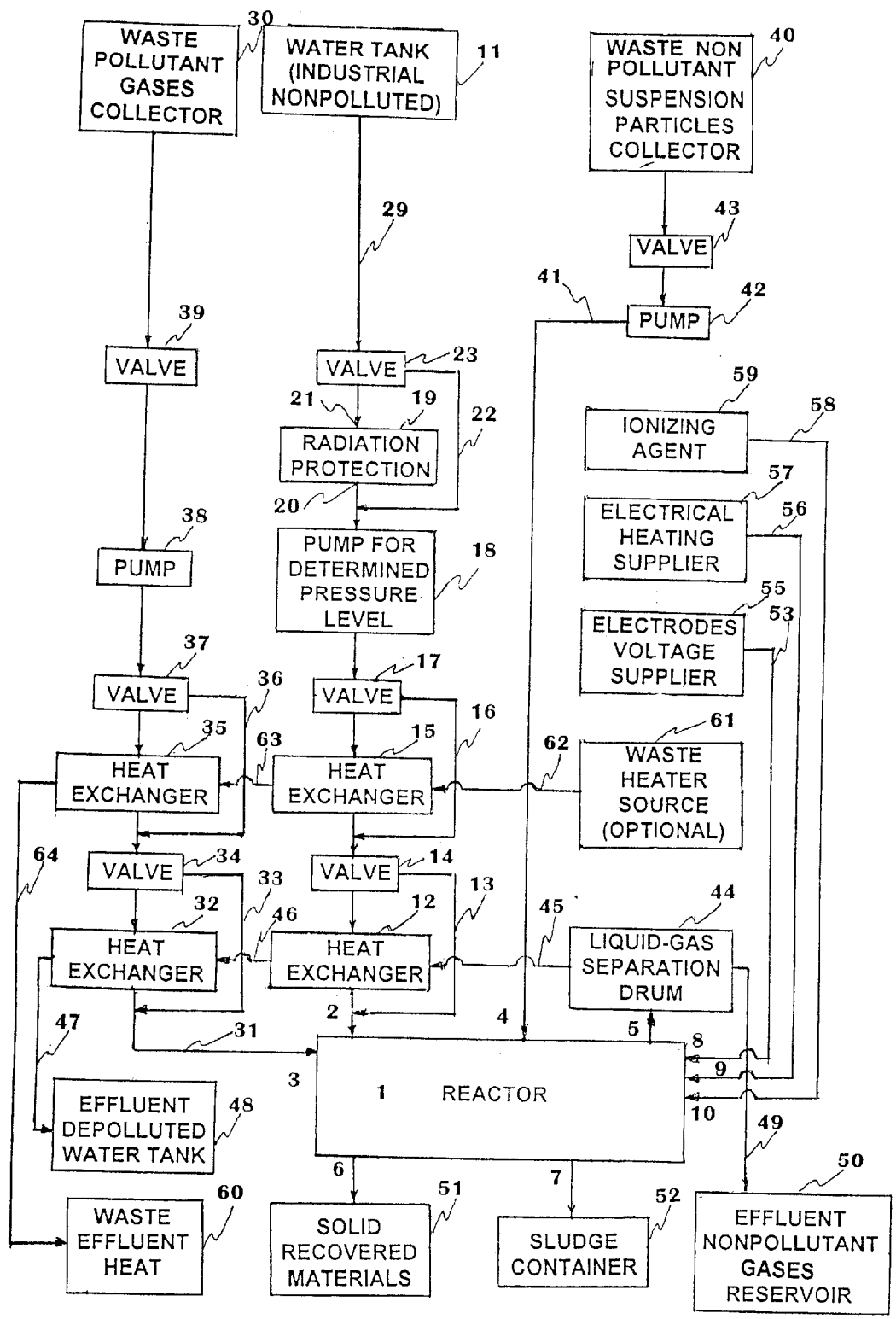
FIG. 11 is a schematic block diagram for waste pollutant gases treatment using non-polluted industrial water and non polluted suspension particles.

In the process presented in FIG. 11, industrial non polluted water and non pollutant suspension particles are used as a medium and respectively as a catalyst of reaction processes for removing and/or recovering of waste industrial pollutant gases. The resulting materials after treatment are non pollutant solid and/or liquid and/or gaseous useful materials.

EXAMPLE 6

Figure 12:
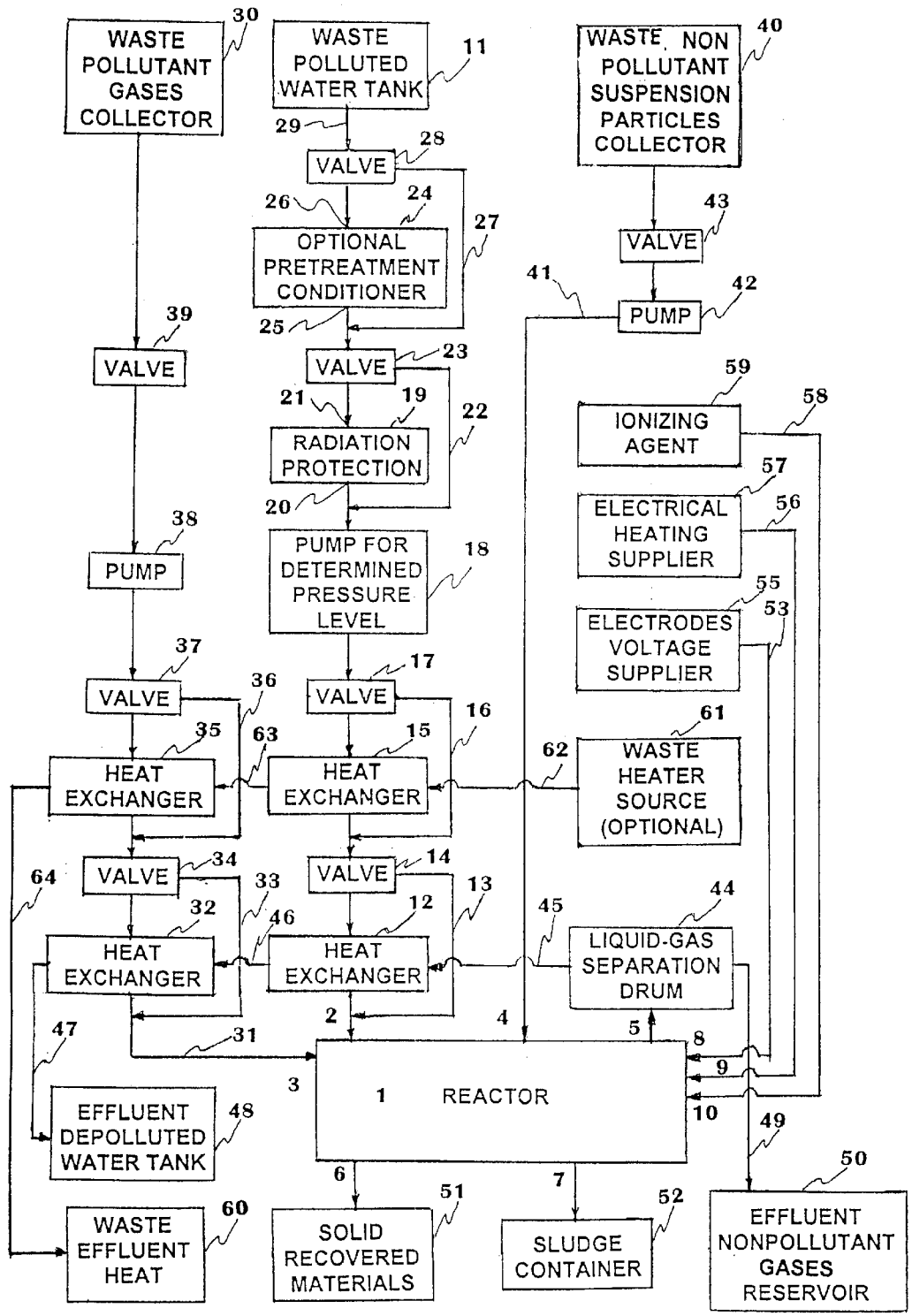
FIG. 12 is a schematic block diagram for a waste polluted water and waste pollutant gases treatment using non polluted suspension particles.

In the process presented in FIG. 12, industrial pollutants of waste polluted water and of waste industrial pollutant gaseous materials are removed and/or recovered using non pollutant suspension particles as a catalyst of reaction between ions and compounds produced by pressure, temperature, electromagnetic radiation, and nuclear radiation fields. The resulting materials are non pollutant/recyclable, which can be used as primary materials for processing of other products.

EXAMPLE 7

Figure 13:
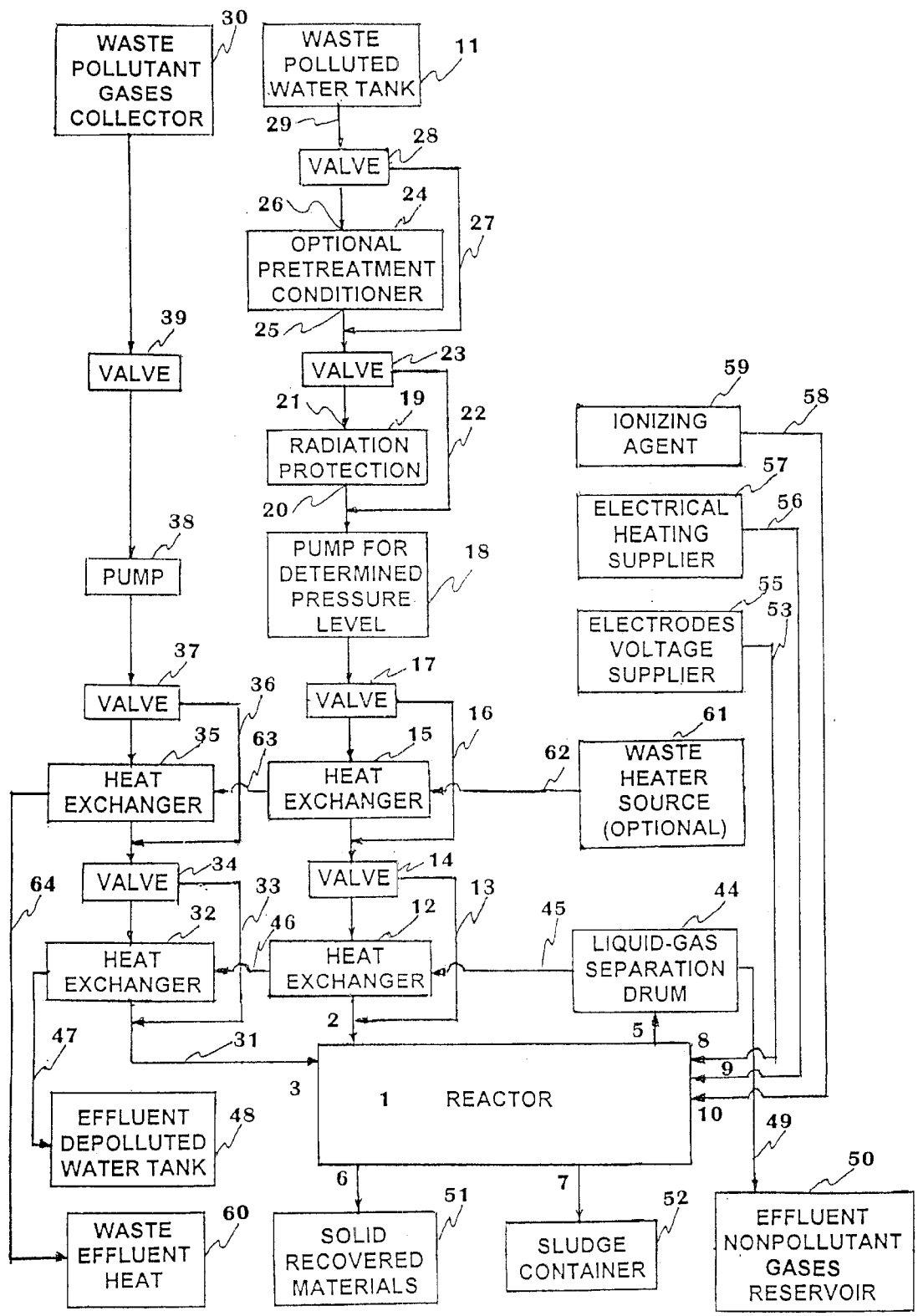
FIG. 13 is a schematic block diagram for waste polluted water and waste pollutant gases treatment.

In the process presented in FIG. 13, the pollutant characteristics of industrial waste pollutant gases and of waste industrial polluted water are reciprocally neutralized using pressure, temperature and radiation fields as ionizing and as chemical reactions agents of pollutant molecules and ions, produced in aqueous solution. The treatment results in non-polluted solid materials and/or recyclable materials depending of the content and the concentration of the components which primary existed in the waste materials.

EXAMPLE 8

Figure 14:
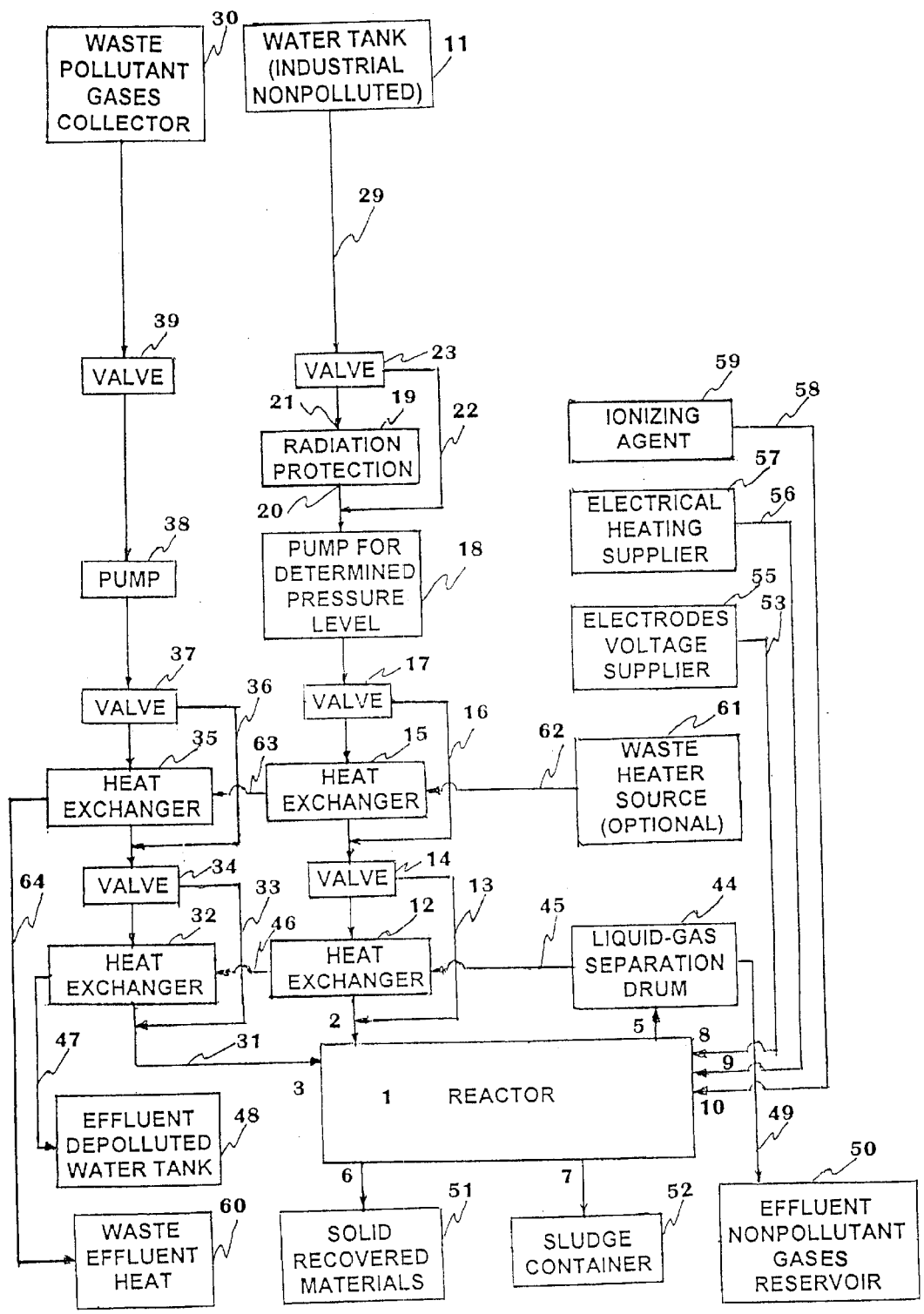
FIG. 14 is a schematic block diagram for waste pollutant gases treatment using industrial non polluted water.

In the process presented in FIG. 14, the primary industrial pollutant gases are removed and/or recovered by using industrial non polluted water as medium and reaction support between pollutant gases, ionized molecules and chemical radicals produced by pressure, temperature, electric, electromagnetic and nuclear radiation fields. The treatment results in non-polluted or recyclable materials used as a primary material for processing of other products.

While the invention has been particularly shown and described above with reference to preferred embodiments thereof, it will be understood by those skilled in the art that other changes in form and details may be made therein without departing from the spirit and scope of the invention. From among a large number of possible applications of the invention, we have only mentioned the eight above examples. However, a large number of other applications can be developed based on the description of above processes which are using the combined and simultaneous/successive conjugated physicochemical effects (CSCPCE) of high pressure, temperature, electric, radiation fields, and air/or aqueous suspension particles used for the removal and/or recovery of pollutant materials from water and air applications without departing from the spirit and scope of the invention. Therefore, these applications, are also covered by this invention.

As mentioned above the methods and procedures for the removal and/or recovery of pollutants, described herein, can be scaled up or down for a small scale or a large scale applications. Two such example are given below.

EXAMPLE 9

Low cadmium (Cd) concentration of elemental $Cd^{2+}$ ions, and as complex ions with Cd in inorganic aqueous dilute acidic or hydroxide or alkaline solution can be removed and recovered as metal and as combination of cadmium compounds, respectively, in the reactor chamber 69 (FIG. 2) by deposition on the selective electrode system 71 (FIGS. 3 and 6) by passing the polluted solution at a moderate pressure and temperature through the reactor chamber 69, with a velocity depending on the primary cadmium concentration, using an electric field of a few Volt/meter, applied between the selective electrodes systems 71 (FIGS. 3 and 6). If the said solution contains cadmium in the neutral state and as non- solubilized compounds, such as those which are contained in $CdBr_2$, $CdCO_3$, $CdF_3$, $CdI_2$, $CdSiO_3$, $CdSO_4$, $Cd(OH)_2$, $Cd(NO_3)_2$, etc., the electromagnetic field or nuclear radiation (optional) is supplementary applied. Various combinations of Cd and other polluted mixtures of Cd can be completely miscible in the liquid state and crystallize together in the some crystal lattice forming a partial or complete series of solid solutions. Among them, in this particular case, the most important solid solutions are those between Cd and its homogenous alloys.

Generally, in any metallic pollutant systems, containing water, a certain concentration of pollutant components are solubilized in a low concentration of hydroxides and/or salts, which are contained in the aqueous solution, and, as a result, the recovery of a large variety of compounds such as those given as examples in Table 1 can be synthesized from such solutions.

TABLE 1

| Class of Compounds | Example of compounds | Type of medium | Class of compounds | Example of compounds | Type of Medium |
|---|---|---|---|---|---|
| Molibdates | $CdMoO_4$ | MeCl | Sulfides | PbS | MeCl |
|  | $SrMoO_4$ | MeCl, MeOH |  | ZnS | MeOH, $Me_2S$ |
|  | $PbMoO_4$ | MeCl |  | FeS | MeCl |
| Germanates | $Zn_2GeO_4$ | MeOH | Complex oxides | $Y_3Fe_3O_{12}$ | MeOH |
|  | $Na_4GeO_4$ | MeOH |  | $Me_3^{2+}$ $Me_3^{3+}$ $Me_2^{4+}O_{12}$ | MeCl |
| Silicates | Cd-Silicates | MeOH | Elements | Cd | MeOH |
|  | Zn-Silicates | MeOH |  | Pb | MeOH |
|  | Mn-Silicates |  |  | Se | MeOH |
| Oxides | PbO | MeOH | Fluorides | $CaF_2$ | MeCl |
|  | ZnO | MeOH | Carbonates | $CaCO_3$ | MeCl |
|  | $Cu_2O$ | MeOH | Phosphates | $AlPO_4$ | $H_3PO_4$ |
|  | $Fe_3O_4$ | MeOH, MeCl |  |  |  |
|  | $GeO_2$ | MeCl |  |  |  |
|  | $Al_2O_3$ | MeOH $MeCO_3$ |  |  |  |

EXAMPLE 10

FIG. 15 represents a block scheme of a "clean town" where the method described in the present invention is applied, at a larger scale, for the removal, recovery and recycling of waste effluent industrial pollutants, using a reactor such as presented in FIGS. 1 to 6 and physicochemical phenomena, and physicochemical principles which are based on this invention, as described above (FIGS. 1 to 14). FIG. 15 shows that all industries, 1 to 9 are concentrated in Area II, between the energetic power sources (Areas I and III). The residential area V, is located outside of a buffer area (III), between a forest and agreement belt (IV), and the agriculture and food industry area (Area VI). The proposed urbanistic topography enables: a more efficient utilization of the electrical power by reducing the power lost; efficient integration of nuclear and alternative energy resources (e.g. solar energy), and enables cost effective solutions to be developed for the environment protection and for utilization of the industry by-products which result from the removal and recovery of industrial pollutants and from materials recycling, etc.

Waste radioactive materials can partially be used as pollutant materials removal agent, as described in the present invention. The buffer zone between the nuclear power station/industry belt and the residential area can be effectively used and integrated in the energetic system using solar photovoltaic (thermophotovoltaic) generators, wind energy generators, hydrogen and oxygen production by water electrolysis and hydrogen storage units. The hydrogen can be used as fuel for the metallurgical industry, for the synthetic gas production from coal, for filing metallic hydrides containers used as fuel for the electric cars, etc. The by-product oxygen can be used for filing oxygen containers for various applications, for the metallurgical industry, for the conversion of escaped organic vapors of various industries into environmentally friendly gases using industrial waste heat, etc. As shown in FIG. 15, the areas I, II, and III supply residential area V, the agreements belt IV, and the agriculture-food industry area VI with industrial goods, energy and synthetic gases. The industry area II and areas III and I receive primary materials, including waste. The interaction between different areas of the "clean town" are functionally interconnected for goods using pollution removal for environment protection, and materials recovery and recycling.

It will be apparent from the FIGS. 1 to 6 and FIGS. 7 to 15 that the present methods and processes for the removal and recovery of pollutants from waste industrial water, waste industrial pollutant gasses and waste industrial suspension particles can be used in continuous or intermittent de-polluting systems in which waste polluted water, waste pollutant gasses and waste pollutant suspension particles are continuously or intermittently supplied. Using line 95 as alternative for flowing polluted aqueous mixtures from the first reactions chamber to the second reactions chamber is for intermittent operation. In such as mode of operation each reaction chamber are successively emptied or filled.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method for removal/recovery of inorganic pollutants from water, gases and suspension particles, said method comprising:
    providing a reaction chamber, said chamber including a container of inherently radioactive materials;
    introducing aqueous liquid media including media containing said pollutants into said reaction chamber;
    applying pressure, heat, electric fields and ionizing radiation provided from said radioactive materials to said media to facilitate desired removal/recovery reactions; and
    withdrawing said pollutants from said chamber.

2. A method according to claim 1, wherein said radioactive materials are spent nuclear fuel.

3. A method according to claim 1, wherein said ionizing radiation includes x-rays.

4. A method according to claim 1, further including applying ionizing visible light to said media.

5. method according to claim 1, further including applying ionizing ultraviolet light to said media.

6. A method according to claim 1, further including applying ionizing microwave energy to said media.

7. A method according to claim 1, wherein said electric fields are applied with a plurality of electrodes within said chamber.

8. A method according to claim 1, further comprising introducing at least one catalyst into said reaction chamber to facilitate further desired removal/recovery reactions.

9. A method according to claim 8, wherein said catalyst is present in said suspension particles.

10. A method according to claim 1, wherein said heat is provided by waste industrial heat.

* * * * *